Oct. 22, 1940.    R. E. YOUNG    2,219,276
OIL BURNING FURNACE AND THE LIKE
Filed Nov. 14, 1938    6 Sheets-Sheet 1

Inventor:
Raymond E. Young,
by Thos. A. Banning
Atty.

Oct. 22, 1940.                R. E. YOUNG                2,219,276
                    OIL BURNING FURNACE AND THE LIKE
                Filed Nov. 14, 1939            6 Sheets-Sheet 4
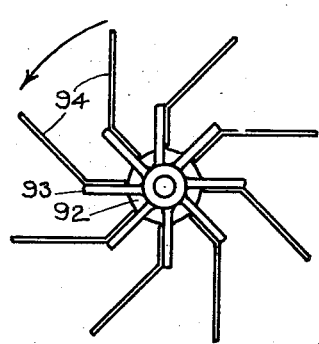
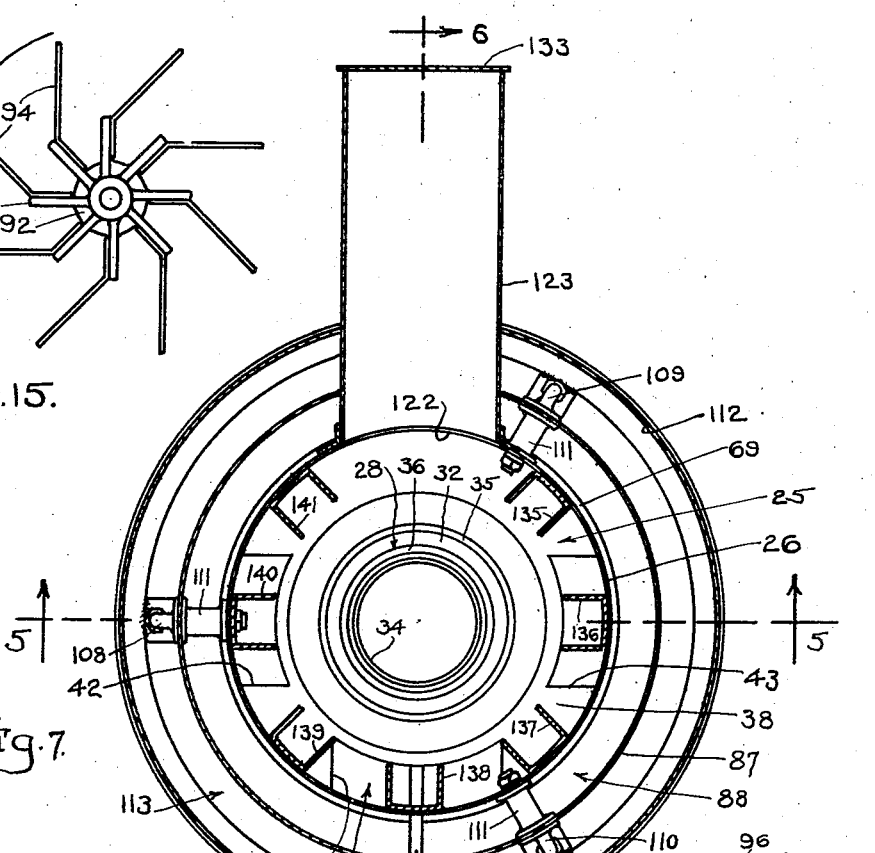
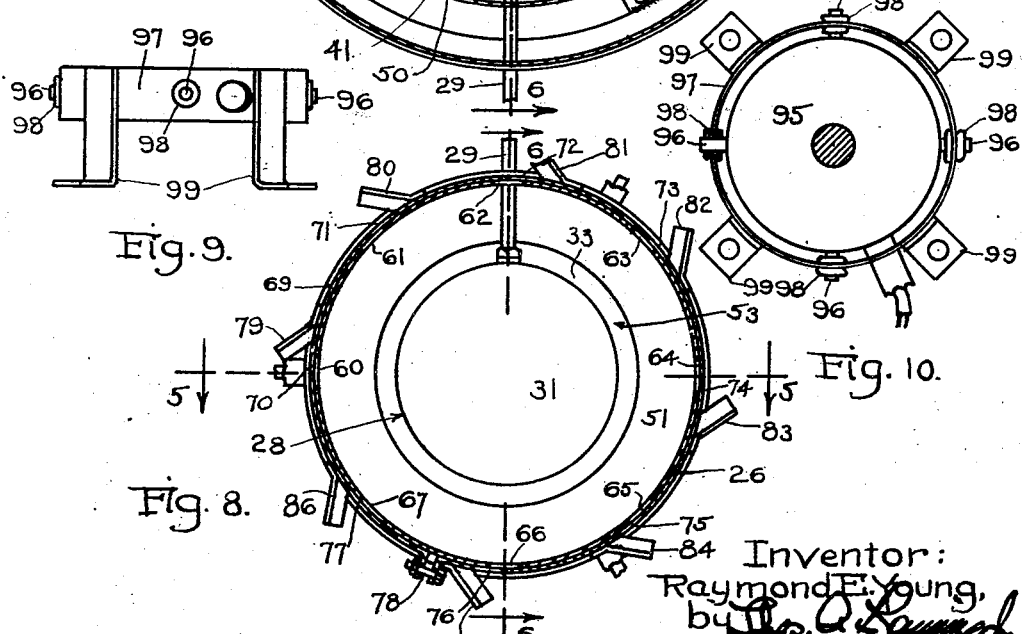

Oct. 22, 1940.   R. E. YOUNG   2,219,276
OIL BURNING FURNACE AND THE LIKE
Filed Nov. 14, 1939   6 Sheets-Sheet 5

Inventor:
Raymond E. Young,

Oct. 22, 1940.    R. E. YOUNG    2,219,276
OIL BURNING FURNACE AND THE LIKE
Filed Nov. 14, 1938    6 Sheets-Sheet 6

Inventor:
Raymond E. Young,
by Ths. A. Young
Atty.

Patented Oct. 22, 1940

2,219,276

UNITED STATES PATENT OFFICE 2,219,276

OIL BURNING FURNACE AND THE LIKE

Raymond E. Young, Harvey, Ill., assignor of one-half to Earle W. Ballentine

Application November 14, 1938, Serial No. 240,347

14 Claims. (Cl. 126—116)

This invention relates to improvements in oil burning furnaces and the like, especially to such devices intended for domestic use as distinguished from industrial uses. Furthermore, the construction herein disclosed is especially intended for use in connection with heating and ventilating systems installed in homes, stores, assembly places and the like, and other similar locations in which the circulation of the heated air is accomplished by the forced draft principle. It is also intended to provide an arrangement such that use may be made of an oil burner of the pot or bulk type as distinguished from atomizing types, thereby providing a very simple arrangement, and one which does not require the use of atomizing devices.

One feature of the invention relates to the provision of an arrangement such that a large amount of heating capacity may be secured without in a relatively small structure; in other words, an arrangement having a high specific heating capacity per unit volume. In this connection it is a further feature of the invention to make provision for a very high heat transfer co-efficient from the combusting gases to the walls of the furnace, and from the said furnace walls to the circulating air stream, and further to accomplish this desirable result in an arrangement such that a very efficient removal of the heat from the combusting gases, and transfer of said heat to the circulating air is produced.

In connection with the feature of producing a high specific heating capacity per unit volume it is a feature of the invention that I have provided a greatly improved and novel form of combustion chamber, operating on a novel and improved principle of operation. Furthermore, a feature in this connection is that the combustion is largely effected by the use of a luminous flame as distinguished from a non-luminous or blue flame, and at the same time provision is made for ensuring a very complete combustion with the use of a very small, if any, excess of air, and with consequent production of flue gases high in $CO_2$ content, and also very small loss of heat due to excess air, or carbon monoxide in the flue gases.

In connection with the foregoing, I have provided a novel arrangement of combustion chamber and movement of the combusting gases therethrough. This arrangement is such that the upwardly flowing luminous flame of the combusting gases is surrounded by a downwardly flowing enclosing envelope of products of combustion finding their way to the flue connection, such downwardly flowing envelope of products of combustion being in contact with the shell of the combustion chamber. The arrangement is such that a large amount of heat from the luminous flame is transmitted to the enclosing shell by radiation through the said envelope, and the arrangement is further such that a large amount of sensible heat is delivered from the said downwardly flowing envelope directly to the enclosing shell by surface contact, so that the enclosing shell is thus heated both by reception of radiant heat from the luminous flame, and also by reception of sensible heat from direct contact of the downwardly flowing products of combustion.

In connection with the transfer of heat from the downwardly flowing envelope of products of combustion to the circulating air outside of the said enclosing shell, and also the transfer of heat from said enclosing shell to said circulating air, I have provided an arrangement which makes possible a very large heat transfer coefficient; and by this expression I mean the amount of heat units which will be transmitted to the circulating air per unit area of heating surface, per degree temperature difference per unit of time. Enlargement of this co-efficient results in increased heating capacity for a furnace of given size, or conversely, a possible specified total heating capacity within a smaller size of furnace. The enlargement of this heat transfer co-efficient may be effected by increase of gas velocity travelling in contact with or adjacent to the receiving or delivering surface, and/or by production of turbulence in the receiving gases or air, and/or by reduction of the thickness of the gas or air film through which heat must be transmitted. The arrangements and constructions herein disclosed are such as to make use of all these expedients in order to increase the heat transfer co-efficient without loss of efficiency of operation.

In connection with the foregoing I have also provided means to produce the desired circulation of the heated air, and have done so by the use of a pressure blower or fan. The pot or bulk type of burner herein disclosed is one which requires a relatively large pressure of combustion air for its best operation, and more in fact than is generally needed for actual circulation of the heated air. I make use of the same blower or fan for delivering both the combustion air and also the circulating air, and I have provided an arrangement such that the excess air pressure may be used for producing turbulence in the circulating air flowing adjacent to the heated shell of the combustion chamber, so that the heat transfer co-efficient from said shell to the circulating air is increased.

In order to increase the heat transfer from the combusting gases to the shell of the combustion chamber I have provided means to increase the surface area of said shell as compared with the surface area of a plain shell, by providing vertical ribs or corrugations on said shell. Sometimes these may also be carried down into the preheating chamber for a similar purpose.

A further feature of the invention relates to the provision of an arrangement of combustion chamber and related parts such that the combustion air delivered to the burner or fire-pot may be preheated to a large extent. This will not only improve the combustion action, but also will increase the delivery temperature of the products of combustion with corresponding increase of efficiency, and will also increase the heat transmitting area of the structure so that the heating capacity thereof is further correspondingly increased. I have also provided in this connection, means whereby the products of combustion flowing downwardly along the outer portion of the combustion chamber are controlled as to their distribution so that any tendency of said products of combustion to crowd towards the flue connection with consequent mal-distribution in the combustion chamber is counteracted, and a very uniform distribution of the streams of gas is produced, with corresponding high efficiency and heat transfer capacity. This also results in a better distribution of the products of combustion in the preheating chamber or section, and immediately prior to their delivery out of the flue connection.

In connection with the increase of heating capacity and increase of heat transfer co-efficient (overall), as well as increase of efficiency and reduction of flue gas temperature, I have provided herein an arrangement in which a very perfect counter-current flow of the products of combustion as compared to the circulating air being heated, is produced. This result is effected by an arrangement in which use is made of a minimum number of passes of the combusting gases as well as a minimum number of passes of the circulating air, thereby providing a very simple structure, and one through which the gas and air movements are produced most efficiently.

A further feature of the invention relates to the provision of an arrangement such that "pilot" or "hold-fire" operation is possible without the need of any artificial draft during such operation. In other words, whereas the operation of the furnace under load conditions is produced by the operation of the forced or artificial draft fan or blower, nevertheless, under pilot or hold-fire conditions no such fan or blower operation is needed, but excellent results are secured by natural draft at such times. This is a very important and desirable feature, making possible considerable economies in motor current consumption, and materially reducing the wear and tear on the motor and fan or blower.

A further feature relates to the provision of an arrangement such that a torch or flare or the like, may be easily introduced into the burner in order to initially light the same. In this connection I have provided an arrangement such that such torch or flare or other lighting medium may be easily introduced through the damper connection or the like. Inasmuch as such lighting instrument must be introduced into the combustion chamber above the burner pot I have so arranged the parts that a direct connection may be effected from the damper connection into the combustion chamber above the fire-pot, but such direct connection is normally closed to a degree which will ensure proper operation and flow of the products of combustion down and through the preheating chamber. Inasmuch as, during pilot or hold-fire operation it is not desired to make use of any preheating action, but to allow the small amount of products of combustion of such pilot or hold-fire operation to pass directly to the flue, I have so arranged the parts that a normally small amount of products of combustion may pass directly to the flue, without flowing through the preheating chamber; and this arrangement also results in a proper and uniform distribution of the products of combustion in their flow to the flue.

In order to improve the pilot or hold-fire operation I have also provided an improved form and arrangement of burner or fire-pot. This arrangement is such that during such pilot or hold-fire operation the flame is largely confined within the central and lower portion of the burner by reason of a baffle or partition within the burner, so that only a relatively small number of air openings are brought into use, whereas when operating under load the entire capacity of the burner comes into play, and all of the air openings thereinto are made effective.

In connection with the burner or fire-pot construction I have also provided means to regulate the amount of combustion air which is delivered thereto under load and other conditions. When operating under load, that is, with fan or blower operation, the normal supply of combustion air is effected through a series of openings which are controlled by damper means having a normal setting; and this is possible due to the fact that the fan or blower delivers its air under sufficient pressure to make such a result possible. On the contrary, when operating under pilot or hold-fire conditions, and without fan or blower operation, sufficient air might not be received by the burner merely under natural draft conditions; and therefore I have provided a supplemental balanced damper arrangement through which the pilot or hold-fire air is delivered to the burner, and which damper will naturally close and remain closed under the pressure air conditions created by fan or blower operation. Thus, while such pilot or hold-fire damper is normally open when the fan or blower is not running, still it naturally closes and remains closed during load operating conditions so as not to interfere with the proper control of the load combustion air by the normally and permanently set damper aforesaid.

Further objects are to provide a very simple form of structure, one which may be built at low cost, one which will be light and still durable, one which may be easily set into place and installed on location, and one which may be made of attractive appearance.

Other objects and uses of the invention will appear from a detailed description of the same, which consists in the features of construction and combinations of parts hereinafter described and claimed.

In the drawings:

Figure 7 shows a horizontal section through the combustion chamber and above the burner or fire-pot, being taken on the lines 7—7 of Figures 5 and 6 looking in the directions of the arrows;

Figure 8 shows a fragmentary section through the furnace at the elevation of the burner or fire-pot, being taken on the lines 8—8 of Figures 5 and 6, looking in the directions of the arrows;

Figure 9 shows a side elevation of the motor supporting bracket;

Figure 10 shows a fragmentary horizontal section on the line 10—10 of Figure 5, looking in the direction of the arrows, being at the elevation of the driving motor and bracket;

Figure 15 shows a detailed section on the line 15—15 of Figure 5 looking in the direction of the arrows, and it shows a modified form of fan or blower which is adapted to provide air delivery with a substantial radial component of velocity against the enclosing chamber so as to produce considerable turbulence in the air;

Figure 1:
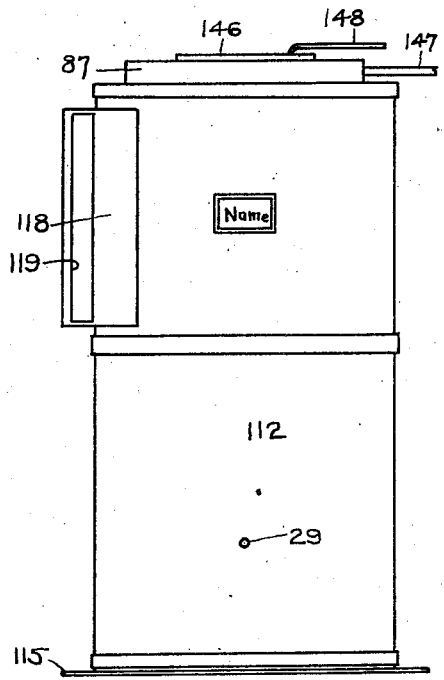
Figure 1 shows a front elevation of a furnace embodying the features of my present invention, same being provided with a circular shell.
Figure 2:
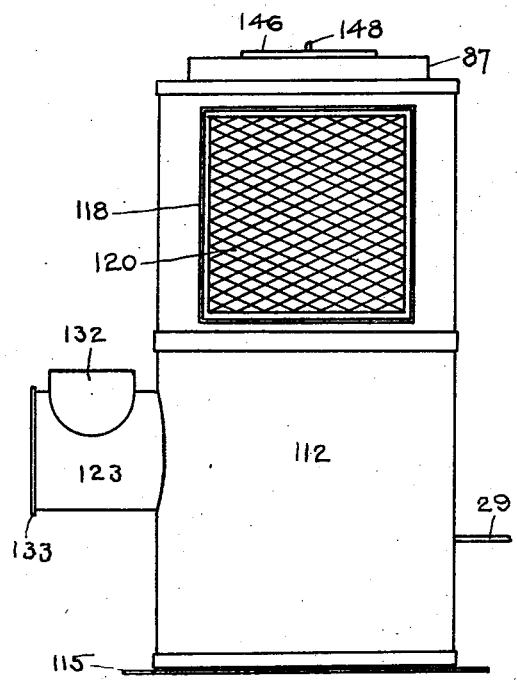
Figure 2 shows a side elevation corresponding to Figure 1, but looking at the circulating air filter side.
Figure 3:
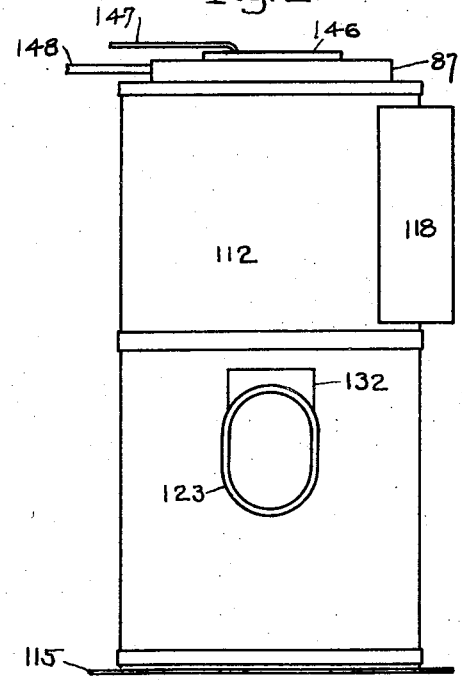
Figure 3 shows a back elevation corresponding to Figures 1 and 2, and looking towards the flue connection.
Figure 4:
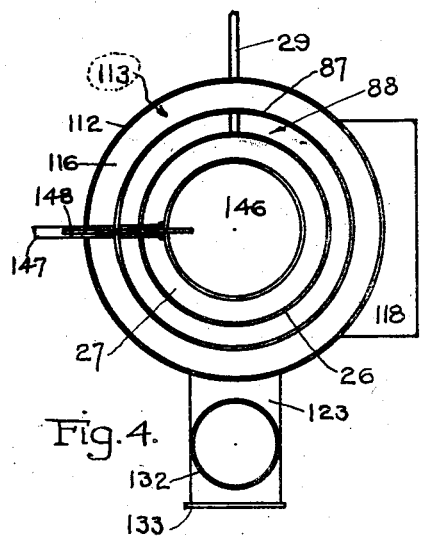
Figure 4 shows a plan view corresponding to Figures 1, 2 and 3.

Referring first to Figures 5 to 15 inclusive, the furnace herein illustrated includes a vertical combustion chamber 25 defined by the cylindrical wall 26 and the top closure 27. Within the lower portion of this chamber there is located the burner or fire-pot 28, which is the bulk or pot type wherein the fuel oil is introduced through a supply pipe, such as 29 so that a small body of such oil is at all times present on the floor of the burner or pot. A suitable regulator (not shown) is provided for maintaining such supply of oil at the proper level on the burner floor, and for admitting the oil at the proper rate therefor. The burner illustrated includes a cylindrical portion 30 to which is brazed or otherwise attached the bottom cup member 31; and a top plate 32 is secured to the flange 33 which extends outwardly from the upper edge portion of the cylinder 30. This top plate 32 has the central opening 34 through which the gases and flame are projected upwardly into the combustion chamber; and preferably there are provided the annular ribs 35 and 36 around the top surface of this plate 32 as shown. The cylindrical member 30 may be provided with a slight enlargement near its upper end as shown at 37.

The burner or fire-pot is secured in place within the lower portion of the combustion chamber by means of the cross-wise extending plate 38. This plate is shown as being edge flanged at 39, and this flange is secured to the cylindrical wall 26. Preferably the burner or fire-pot is secured to the under face of the plate 38 by suitable bolts extended through these parts; and in such case a gasket or the like 40 should be placed between the flange 33 and the plate 38, such gasket being conveniently made of a ring of steel faced by asbestos or the like.

It is here noted that the plate 38 is provided with a series of edge recesses or openings 41, 42 and 43, two of which, namely 42 and 43 are located at lateral positions with respect to the flue connection, presently to be described, and the other of which openings, namely 41, is located directly opposite to the flue connection. These openings serve to permit down flow of the products of combustion from the lower portion of the combustion chamber, proper, to the space below the plate 38, which space comprises in effect a preheating chamber, presently to be described. These openings 41, 42 and 43 are so proportioned that the down flowing products of combustion will be distributed with a substantial uniformity around the entire perimeter of the combustion chamber, and will be then caused to flow through the preheating chamber to the flue connection in the desired manner.

Figure 6:
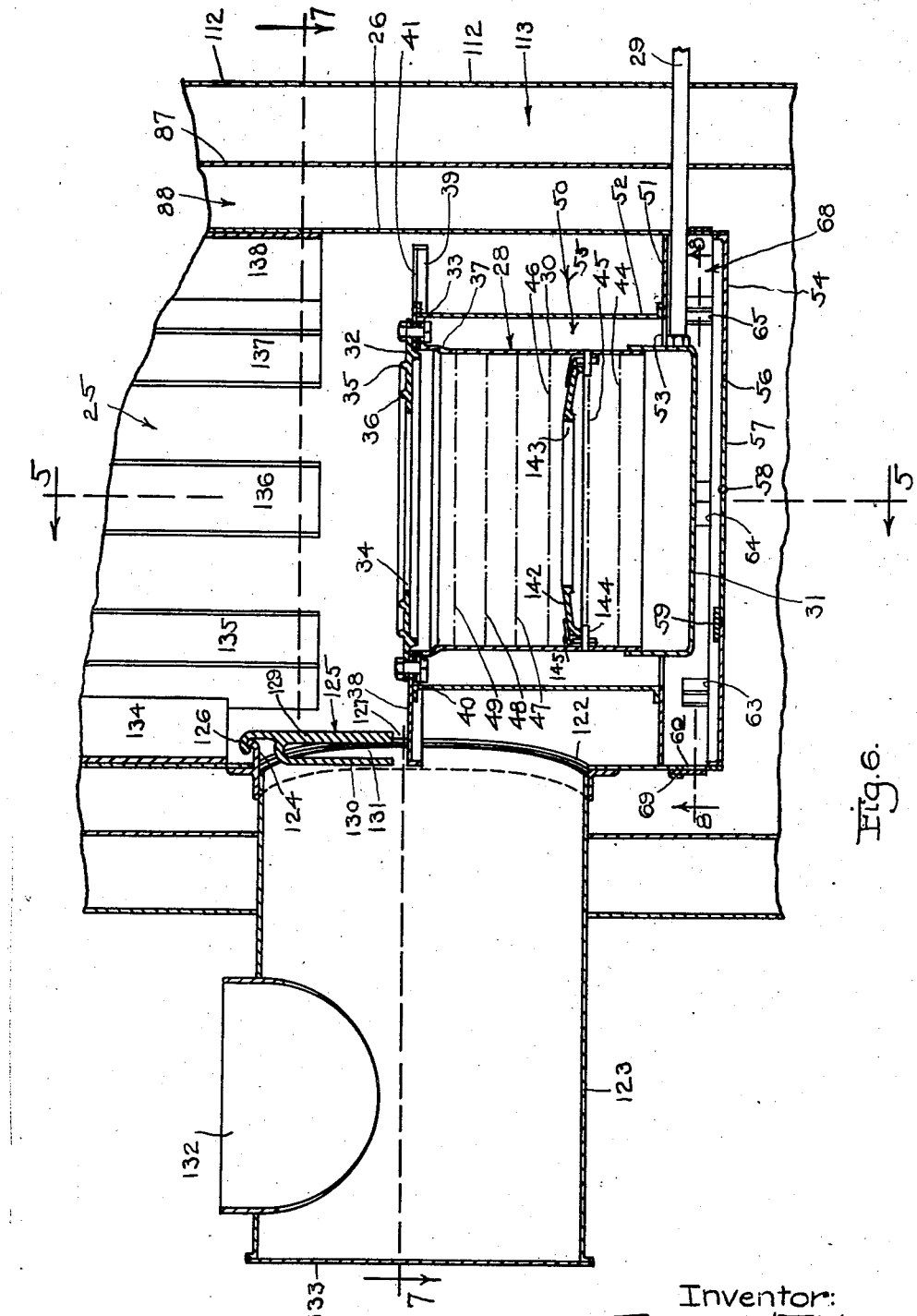
Figure 6 shows a fragmentary vertical section at right angles to Figure 5, and on enlarged scale, being taken on the lines 6—6 of Figures 5, 7 and 8, looking in the directions of the arrows.
Figure 11:
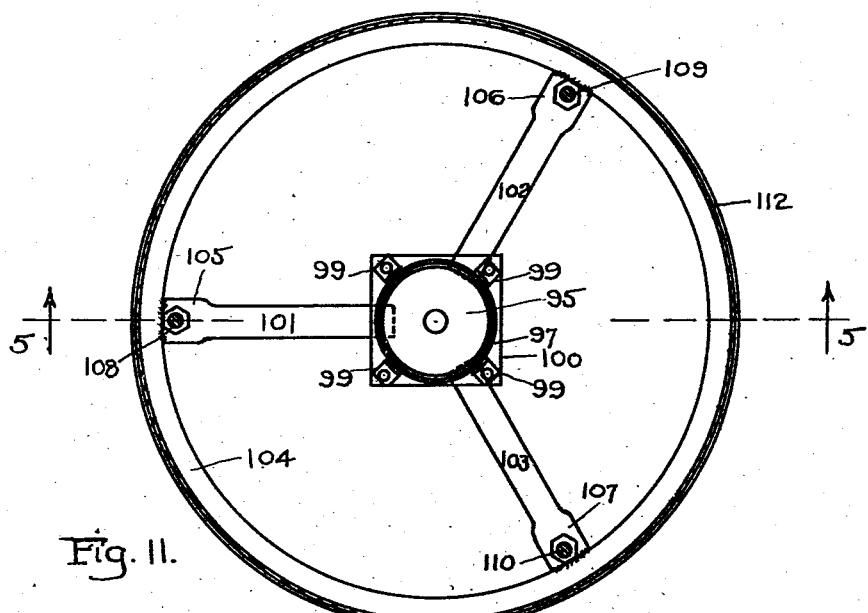
Figure 11 shows a horizontal section at the elevation of the base plate or ring, being on the line 11—11 of Figure 5, looking in the direction of the arrows.
Figure 14:
Figure 14 shows a detailed modification of the connections of the humidifying water supply and overflow to the pan therefor.

The cylindrical wall 30 is provided with a series of small air openings arranged around its perimeter in a series of rings, and the broken lines 44, 45, 46, 47, 48 and 49 in Figure 6 show the locations of these rings of small holes, which holes themselves are not specifically shown due to their small size. The exact number and size of these holes is largely a matter of selection for the size and proportions of the burner in question, but the following is given as an illustration of a specific burner or fire-pot which has been found to give excellent service; with a circular burner or fire-pot ten inches internal diameter and nine and one-half inches internal height, the rows or rings of holes shown by the lines 44, 45, 46, 47, 48 and 49 are 1 and ⅓ inches apart; the row 49 contains 122 holes each 0.110 inch diameter; and each of the rows 44, 45, 46, 47 and 48 contains 95 holes, each 0.098 inch diameter. This data is given merely by way of illustration.

Surrounding the burner or fire-pot there is the "preheating chamber" 50. The floor of this chamber is defined by the ring 51 which extends between the lower portion of the cylinder 26 and a short cylinder 52 which occupies a location between the burner or fire-pot and the said cylinder 26. This short cylinder 52 extends upwards to the plate 38 already referred to, so that there is complete exclusion of the products of combustion from the preheating chamber; but effective transfer of heat between the gases in the preheating chamber and the combustion air between the short cylinder 52 and the burner or fire-pot may take place. The ring plate 51 does not extend inwards past the position of the short cylinder 52, but there is left the combustion air opening 53 around the burner or fire-pot and up through which the combustion air flows to the small burner openings already referred to.

The lower end of the cylindrical chamber 26 is closed by the plate 54, whereby there is provided a small chamber beneath the plate 51, and in communication with the air chamber 55 through the opening 53 already referred to. This closing plate 54 has a relatively large central opening 56, over which there is placed the balanced damper 57. This damper 57 is pivoted transversely as shown at 58 slightly off center, so that the damper normally tends to stand open, but so that a slight force will cause it to shut against the stop 59. As a consequence, when only a small amount of air is required for combustion, and under very light pressure such as natural draft, this damper will stand open, thereby allowing a substantially unobstructed flow of combustion air for pilot or hold-fire operation to move to the burner openings; whereas, when the fan or blower presently to be described is started for load operation, there is created beneath the damper 57 a pressure which closes said damper, due to its unbalanced pivoting, so that during such load operation other provision is relied on for the supply and control of the air for combustion, to the burner or fire-pot.

Around the lower portion of the cylindrical shell 26 there is provided a series of equally spaced openings 60, 61, 62, 63, 64, 65, 66 and 67, through which combustion air for load operation is supplied to the space 68 beneath the plate 51, which air then flows through the opening 53 and space 55 to the small openings in the burner or fire-pot. There is a split metal ring 69 placed around the lower end of the shell 26 and over the said openings 60-67 inclusive, which ring has the equally spaced openings 70, 71, 72, 73, 74, 75, 76 and 77 corresponding to the openings 60-67, and by setting this ring 69 backward or forward the sizes of the openings which will be exposed may be regulated. The bolt 78 is provided for securing the ring 69 in adjusted position.

It is here noted that the combustion air for load operation which comes up to the position of the ring 69 has a substantial angular component of velocity, as well as its vertical component of velocity; and therefore I have provided the small blades or deflectors 79, 80, 81, 82, 83, 84, 85 and 86 on the ring 69, in locations adjacent to the openings 70-77 inclusive. These deflectors are conveniently in the form of short sections of angle bar, bent to the desired angle as shown in Figure 8, and secured to the ring 69 with their horizontal flanges above the opening locations. As a result, the upflowing air from the fan or blower will be caught beneath these deflectors and the proper amount will be deflected through the openings and into the space 68 for delivery to the small burner or fire-pot openings.

Surrounding the cylindrical shell 26 and spaced therefrom is another cylindrical shell 87 to thereby establish the upflow circulating air passage 88 which completely surrounds the shell 26.

Figure 5:
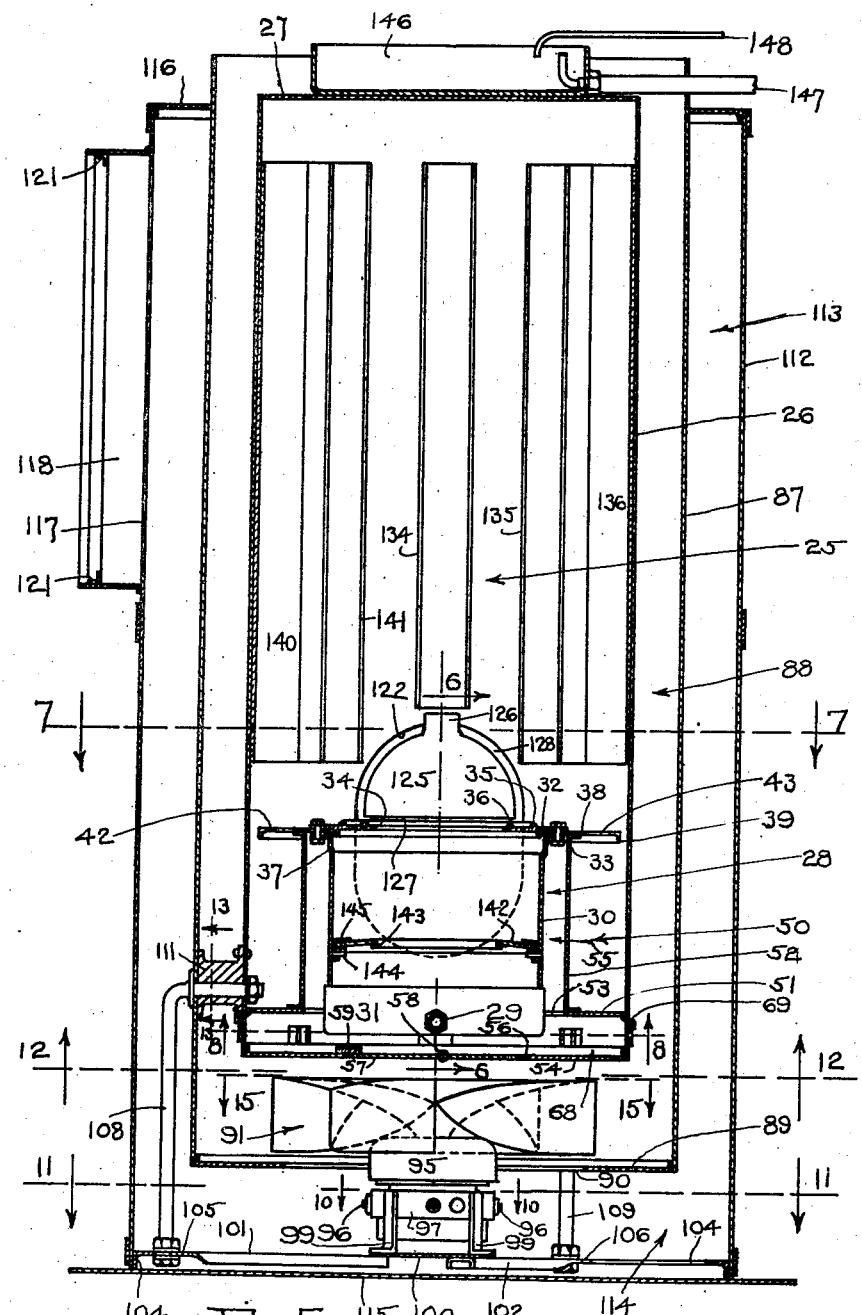
Figure 5 shows a vertical transverse section through a furnace embodying the features of my present invention, being taken on the lines 5—5 of Figures 6, 7, 8, 11 and 12, looking in the directions of the arrows.

The lower end of this shell 87 is closed by the bottom plate 89 having the relatively large central opening 90. The fan or blower 91 is placed just beneath the plate 54 and above the plate 89, and serves to draw air through the opening 90 and deliver it through the controlled openings 60-67 inclusive for load operation; but the major portion of the air delivered by this fan or blower is moved upwardly through the passage 88 and constitutes the circulating air for the heating and ventilating system. It is here noted that the major portion of said air (being the circulating air) must therefore be delivered laterally or radially from the fan or blower to reach the passage 88; and I have therefore herein shown a fan or blower which is very well adapted for such radial or lateral air delivery. It includes a series of blades 91 extending out from a central stem or hub portion, as shown in Figure 5; or, as shown in Figure 15, which shows a modified form of fan or blower, said fan or blower may include a central hub portion 92 having a series of outwardly extending arms 93 to which are secured the blades or paddles 94, which are curved or bent so that they trail as compared with the direction of rotation, shown by the arrow in Figure 15. The point to be here noted is that the fan is one which has a high delivery pressure, and is also one which delivers the air with a large radial component of travel directly outward from the hub. The desirability of this will be soon apparent.

The fan or blower is carried by the upper end of the shaft of the driving motor 95. This motor is carried by a series of outwardly extending pins 96 which pass through openings in a supporting ring 97, and each of these openings is preferably lined with the rubber or other gasket 98 so as to provide a quiet operating motor support. The ring 97 is carried by a series of arms 99 which reach down and are connected to a small base plate 100. This base plate is in turn connected to the inner ends of a series of radial arms 101, 102 and 103, said arms being lengths of channel stock. A convenient arrangement is that illustrated, in which the connection between each such arm and the plate 100 is effected by welding the web of the channel face to the bottom of the plate 100, as shown. There is a surrounding ring 104 of angle stock, and the outer ends 105, 106 and 107 of the arms 101, 102 and 103 are connected thereto. A convenient arrangement is that illustrated; in which the outer end portion of each such arm is flattened, and then the extreme end of such flattened portion is end welded to the inner facing edge of the angle 104. These flattened portions also constitute supports for the brackets presently to be described. The conduit 108 for supply of current to the motor is conveniently carried inwardly through the ring 97 as shown.

Figure 13:
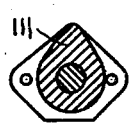
Figure 13 shows a fragmentary section through one of the supporting brackets of stream-lined cross-section, being taken on the line 13—13 of Figure 5, looking in the direction of the arrows, but on enlarged scale.
Figure 12:
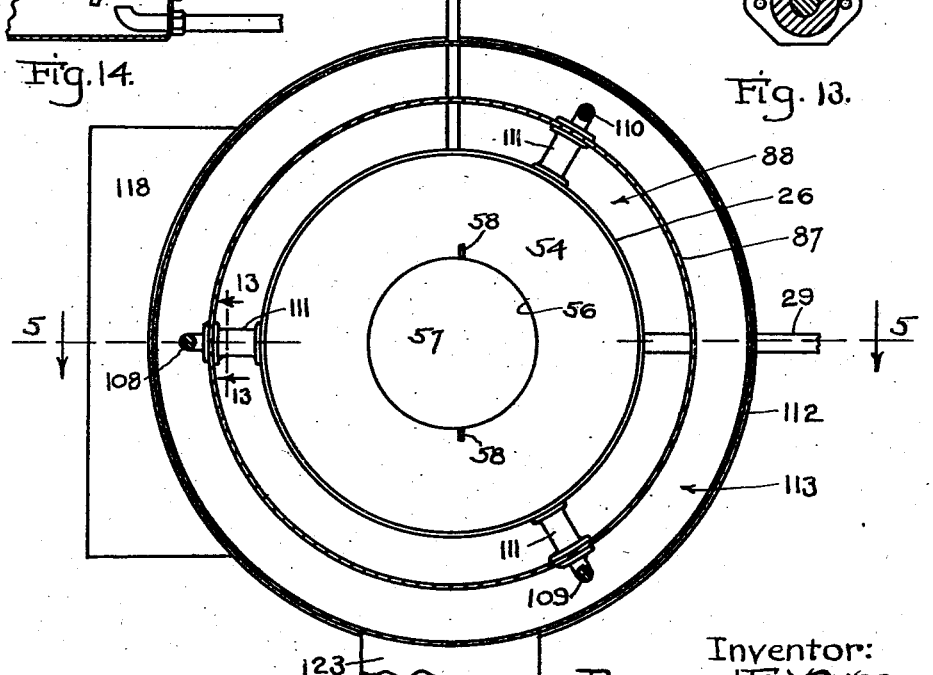
Figure 12 shows a horizontal section looking upwards at the elevation of the pilot or hold-fire damper, being taken on the line 12—12 of Figure 5, looking in the direction of the arrows.
Figure 17:
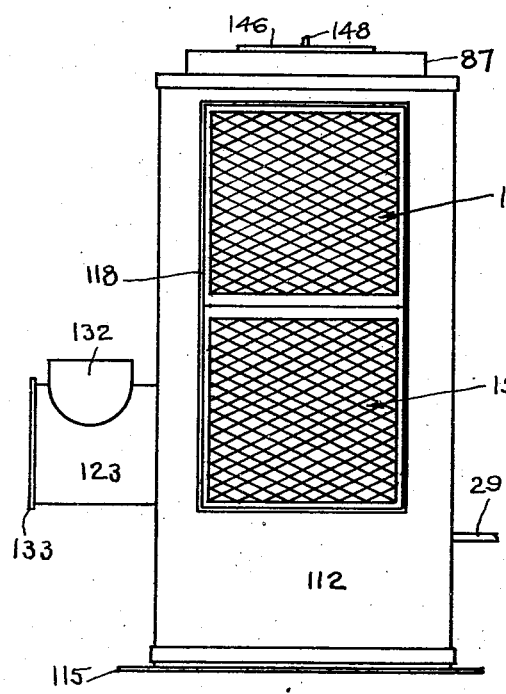
Figure 17 shows a view similar to that of Figure 2, but illustrating a construction of Figure 16.
Figure 16:
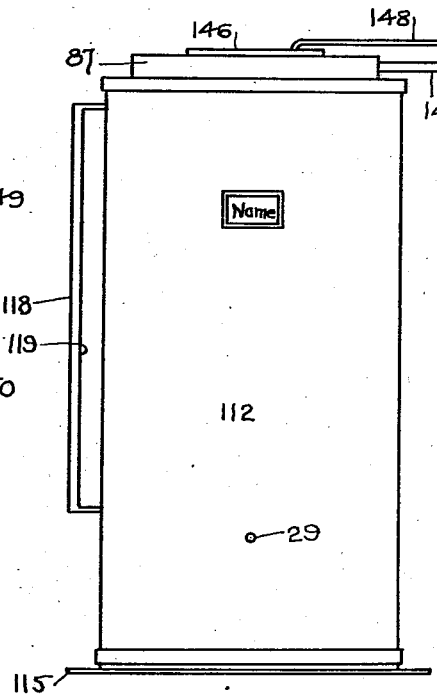
Figure 16 shows a view similar to that of Figure 1 but illustrating a modified form of cabinet which is square, and which is provided with a double size filter receptacle.
Figure 18:
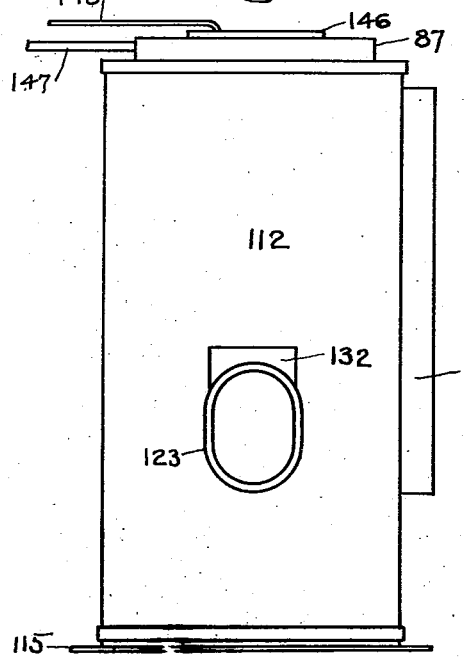
Figure 18 shows a view similar to that of Figure 3, but illustrating the construction of Figures 16 and 17.
Figure 19:
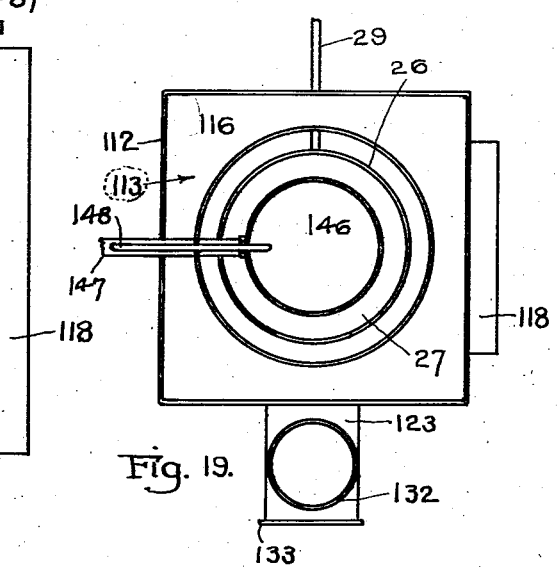
Figure 19 shows a view similar to that of Figure 4, but illustrating the construction of Figures 16, 17 and 18.

The upper end of the shell 87 is connected to the proper duct for delivery of the heated air to the heating system. Both the shell 26 and the shell 87 are supported by means of the three brackets 108, 109 and 110, shown in several of the figures. Each of these brackets has a vertical portion, the lower end of which is suitably connected to the flattened arm portion 105, 106 or 107, as the case may be, and the upper portion of such bracket arm is bent at right angles as shown, and carried horizontally through both of the shells 87 and 26. A spacer 111 is located on each of such horizontal portions, so that when a bolt or nut is drawn up tight the two shells will be securely clamped and held to this spacer. The spacers are preferably of generally stream-lined form as shown in Figure 13, and it is here noted that the flow of air through the passage 88 is upwardly, and therefore the streamlining should be as shown in Figure 13.

The ring 104 constitutes in effect a base ring for the furnace support. There is an outer shell 112 of cylindrical form placed around and spaced away from the shell 87, so as to establish the annular passage 113 between said shells 87 and 112. The incoming cool air enters said passageway 113 at the upper portion of the furnace and travels downwardly therethrough to the space 114 beneath the plate 89. From said space 114 said air flows through the opening 90 to the fan or blower. It is noted that the space 114 lies substantially at floor level, and should be sealed inasmuch as it is not desirable that any air should leak into said space from the outside. Therefore it is desirable to set the base ring 104 down on a plate 115 which will establish a substantially air tight seal with said ring.

The upper end of the shell 112 receives a ring plate 116 which seals the space 113 to close the same. The circulating air is supplied into the annular space 113 through an opening 117; and generally there is provided means to filter the air flowing into said opening. For this purpose I have shown the flange 118 extending outwardly from the shell 112 around the opening 117, which flange has the side slotted opening 119 through which one or more filter units such as 120 may be slid into place over the opening 117 so that the incoming air will be filtered.

The flange or neck 118 may be provided with angle bar guides such as 121 to establish guide tracks for the filter units as they are slid into place, and to hold said units in position.

There is a flue connection or opening 122 located in the rear portion of the combustion chamber shell 26, and a flue 123 reaches backwardly therefrom. Reference to Figures 5 and 6 shows that this connection is so placed that it reaches both above and below the location of the plate 38 which establishes the lower end of the combustion chamber proper. The arrangement shown is one in which the flue connection and the flue itself are of oval shape with the major axis thereof vertical, but manifestly other forms may also be used. The flue connection is in the form of a flange or ring member which is secured to the edge of the opening in the shell 26; and there is a tongue 124 reaching inwardly from this flange member into the combustion chamber. A damper 125 is swung from this tongue and hangs over the flue opening. This damper has the hook 126 which rests on the tongue and is so formed as to permit the damper to swing inwardly a substantial amount without danger of coming off the tongue. It is noted that this damper reaches down to a position close to the plate 38 but somewhat above the same so as to provide the small opening 127 just above the plate 38 and which does not close; and furthermore, the damper can be swung inwardly without interference because it clears the parts within the combustion chamber during such movement. Examination of Figure 5 also shows a small clearance 128 around the damper and establishing direct connection between the combustion chamber and the flue.

Study of Figure 6 in particular will show that with this arrangement the envelope of hot products of combustion flowing downwardly along the inside of the shell 26 will flow chiefly downward through the openings 41, 42 and 43 into the preheating chamber 50, then partially around said chamber to the flue connection; but that a portion of said gases may find its way directly to the flue connection past the damper 125. The proportions and distribution of these gases will depend among other things on the sizing of the openings 41, 42 and 43, and on the leakage past the damper 125, and by properly proportioning these openings a substantially uniform distribution of all the gases may be secured. In some cases it may be found that the damper 125 may be made to substantially close the side portions of such opening, leaving a small opening beneath the damper, or vice versa.

It is also noted that the damper 125 is shown as comprising the two separated flanges 129 and 130 with the air space 131 between them. This is to establish a better heat insulation against direct loss of heat into the flue. It is also noted that the flue 123 is provided with the angle connection 132 which may be connected to the chimney, and with the removable end plate 133 which, when removed, provides for direct reaching through the flue connection to the interior of the combustion chamber. It is thus possible to push the damper 125 backwardly and reach a taper or other lighting device into the burner or firepot to light the same, or for other reasons, such as cleaning. It is thus seen that I have so placed the parts that such access to the interior may be effected through the flue connection and without the need of a special access door.

The surface area of the inner surface of the shell 26 is in direct contact with the downwardly flowing products of combustion or envelope. I have provided an arrangement and process of combustion or method which make possible a very large specific heating capacity, and the size of the unit for a given heating capacity is relatively small as compared with other units heretofore known. A large proportion of the heat of combustion constitutes luminous heat radiation from the luminous central flame which reaches upwardly from the burner opening towards the top 27 of the combustion chamber, and it is not necessary, as far as the requirements of size for this part of the heating action are concerned, to use a combustion chamber of large diameter. Therefore it is desirable to increase the surface area of the enclosing wall portion of the combustion chamber in order to increase the transfer of sensible heat thereto, but without increase of diameter of said combustion chamber shell. This might be done in various manners, as for example by corrugating the said shell; but in the arrangement herein shown this result is secured by provision of a series of vertical channel members 134, 135, 136, 137, 138, 139, 140 and 141 on the inside face of the shell 26, placed and secured with their webs against said shell as shown. These channel webs may be riveted or welded to the shell 26 or otherwise secured thereto. Furthermore, these channels extend for as much vertical dimension as possible within the combustion chamber, and it is noted that the channel 134 is shortened due to the presence of the flue connection at that location.

The following explanation will assist in understanding the operation of this furnace;

The flame rises from the burner through the opening 34 thereof as a luminous flame and ascends towards the top 27 of the combustion chamber. During this action, and more especially towards the top of the combustion chamber, the gases spread out and flow downwardly along the outer portions of the combustion chamber and close to the shell 26 and the vertical ribs. Finally this downwardly flowing envelope reaches the openings 41, 42 and 43 (a portion flowing directly out through the narrow opening 128 around the damper 125), and the gases flowing down into the preheating chamber 50 travel partially around the same and are delivered to the flue connection.

The transfer of heat from the luminous flame by radiation to the shell 26 and vertical flanges takes place through the downwardly flowing hot envelope, but the resistance of this envelope to such radiation is small due, among other things, to the relatively high temperature of said envelope. Thus a very large proportion of the heat of combustion is delivered directly to the shell by radiation.

Since the combustion chamber is of comparatively small diameter for the heating capacity intended, the volume of gases travelling therein is so large that the downwardly flowing envelope is relatively thin, this condition being of advantage for securing a high heat transfer co-efficient from the said envelope to the shell, and vertical flanges. Likewise, this fact causes a relatively high gas velocity which is also conducive to securing a high heat transfer co-efficient. Since the resistance of the metal portions (the shell 26 and the webs of the vertical channels) to heat transfer by conduction is small as compared to the skin and gas film resistance, it is seen that but little reduction of heat transfer co-efficient is caused by the manner of connection of the channels to the shell; but nevertheless the high gas velocity and relatively thin nature of the gas envelope are both conducive to high heat transfer co-efficient, and therefore high specific heating capacity.

The subsequent transfer of the heat from the shell 26 to the upflowing stream of air within the passage 88 is due to and is controlled by the well understood laws of such heat transfer. These include, among other things, the fact that increase of velocity serves to increase the heat transfer co-efficient, reduction of the thickness of the stream or film of the air in contact with or flowing adjacent to the hot wall also increases the heat transfer co-efficient; and in particular, creation of turbulence in said stream results in marked increase of heat transfer co-efficient. I avail myself of all these conditions in the present case.

The passage 88 is made of relatively small thickness so that the air is confined close to the shell 26; the velocity of the air is thereby also increased; but I have so arranged the parts as to produce a large amount of turbulence in the air stream, and have done so with a minimum amount of complexity. It was previously mentioned that the fan or blower delivers its air with a large radial component of motion and under greater pressure than normally needed for circulation in the heating system. As this air leaves the fan or blower it is thrown laterally against the inside face of the lower end portion of the shell with high velocity, and then suffers a very sudden right angular change of direction. The result is that a high turbulence is immediately produced, and the air then starts flowing up through the passage 88 under ideal conditions for high heat transfer co-efficient. The fact that the fan or blower has a higher delivery pressure than generally needed for the circulating air system (such pressure being desirable in order to secure best burner operation with the type of burner herein disclosed), creates the condition that such excess of pressure may be used for creation of such turbulence where needed.

The incoming air from the filter and flowing down through the passage 113 serves as a blanket against loss of heat from the heated air in the passage 88, since such heat is taken into the air flowing down through the passage 113 and serves to preheat the same.

It is noted that the hot envelope of products of combustion within the combustion chamber is flowing downwardly in said chamber, whereas the air stream within the passage 88 is flowing upwardly therein. As a result there is produced a very perfect transfer of heat by counter-current flow in the two locations, which condition is ideal for highest efficiency.

It is noted that the provision of the preheating chamber 50 serves to greatly increase the heating surface and capacity of the furnace, as well as increasing the efficiency of the operation thereof.

The burner herein shown includes the primary ring 142 set into the burner pot between the rows of holes 45 and 46. This ring has the central hole 143, and the ring itself is set down on the pins 144 reaching inwardly from the pot. Suitable clips 145 may be provided reaching upwardly from the pins 144 and bent over the edge of the ring to hold it in place during shipment or otherwise.

If desired, a humidifying pan 146 may be set on the hot top of the combustion chamber 27, and suitable pipes 147 and 148 are provided for supplying humidifying water, and for removing excess thereof. It is noted that this pan is set on the top 27 directly above the position of the luminous flame, and therefore where a large heating action is produced.

The outer shell 112 of the arrangement shown in Figures 1, 2, 3 and 4 is circular or cylindrical in shape. In the modified arrangement of Figures 16, 17, 18 and 19 this shell is shown as being square. Furthermore, in this modified arrangement I have shown a filter unit which includes two sections 149 and 150, placed one above the other so as to provide increased filtering capacity.

When operating on pilot or hold-fire operation, the fan or blower is idle. The damper 57 then falls to the open position to establish a large opening directly from the space beneath the plate 54 to the burner air chamber 55. As a result a sufficient supply of air for pilot or hold-fire operation is made available by natural draft. The result is that a blue flame combustion is produced of small size, and which flame may pass directly to the flue connection beneath the damper 125, and without having to fill the combustion chamber. This passage of products of combustion from such small blue flame directly to the flue will produce a relatively high flue gas temperature, so that ideal conditions are produced for the pilot or hold-fire operation; and also the relatively high flue temperature thus maintained will ensure best operation occurring when the load condition again occurs due to operation of the fan or blower.

It is noted that the circulating air delivered by such a fan or blower as illustrated in Figures 5 and/or 15 has a large rotary component of travel at delivery, so that the air flowing up through the passage 88 will also have a considerable rotary motion during such travel. Therefore said air will tend to travel upwardly with a spiral path, and will therefore travel a much greater distance to reach the top of said passage than the direct vertical dimension of this passage. Consequently this circulating air will be retained in contact with, or subject to the heating action of the shall 87 for a greater distance than would otherwise be the case, with consequent improvement of the heating action and efficiency.

In some cases it may be found desirable to carry the ribs 134, 135, 136, 137, 138, 139, 140 and 141, or some of them downward into the preheating chamber so as to increase the surface subject to the heating action of the gases.

While I have herein shown and described only certain embodiments of my present invention, still I do not intend to limit myself thereto, except as I may do so in the claims to follow.

I claim:

1. In a furnace, the combination of a vertical axis cylindrical combustion chamber, having its upper end closed, a vaporizing oil burner located in the lower end of said chamber, and having a flame opening leading upwardly into the lower end of the combustion chamber, means to seal the burner to the lower portion of the combustion chamber, and a flue gas outlet from the combustion chamber located substantially at the level of said flame opening and extending both above and below said level, and a pressure air connection into the burner, substantially as described.

2. In a furnace, the combination of a vertical axis cylindrical combustion chamber, having its upper end closed, a vaporizing oil burner located in the lower end of said chamber, and having a flame opening leading upwardly into the lower end of the combustion chamber, means to seal the burner to the lower end of the combustion chamber, a flue gas outlet from the combustion chamber located substantially at the level of the flame opening, a series of air openings in the wall of the burner, and means to supply air for combustion to said air openings, comprising a vertical axis fan or blower located axially beneath the burner together with passages leading therefrom vertically to said air openings, substantially as described.

3. In a furnace, the combination of a vertical axis cylindrical combustion chamber, having its upper end closed, a vaporizing oil burner located in the lower end of said chamber, and having a flame opening leading upwardly into the lower end of the combustion chamber, means to seal the burner to the lower end of the combustion chamber, a flue gas outlet from the combustion chamber located substantially at the level of the flame opening and extending both above and below said level, there being a series of combustion air openings into the burner, and a pressure fan communicating directly with said openings to maintain a plenum through said openings and into the burner, substantially as described.

4. In a furnace, the combination of a vertical axis cylindrical combustion chamber, having its upper end closed, a vaporizing oil burner located at the lower end of said combustion chamber, and having a flame opening leading upwardly into the combustion chamber, means to seal the burner to the lower end of the combustion chamber, a flue gas outlet from the combustion chamber located substantially at the level of said flame opening and extending both above and below said level, means to establish an annular heating air passage around the combustion chamber from the lower to the upper end thereof, suitable air openings from the lower portion of said annular passage into the burner for supply of combustion air to the burner, damper means for said openings, and plenum means beneath the burner for delivery of air directly to the lower portion of the annular passage, substantially as described.

5. In a furnace, the combination of a vertical axis cylindrical combustion chamber, having its upper end closed, a vaporizing oil burner located at the lower end of said combustion chamber, and having a flame opening leading upwardly into the combustion chamber, means to seal the burner to the lower end of the combustion chamber, a flue gas outlet from the combustion chamber located substantially at the level of the flame opening, and extending both above and below said level, there being openings in the burner and a pressure fan communicating with said openings for supplying plenum combustion air into the burner, whereby there is established within the combustion chamber an upwardly extending radiant heat flame together with a downwardly extending envelope of products of combustion leading to the flue gas outlet, substantially as described.

6. In a furnace, the combination of a vertical axis combustion chamber having its upper end closed, and having an oil vaporizing burner sealed to its lower end, a flue gas outlet from the combustion chamber substantially at the level of the burner, and extending both above and below said level, a pressure fan and pressure air delivery connections therefrom to the burner for supply of plenum air to the burner, whereby there is established an upwardly extending radiant heat flame in the central portion of the chamber and a downwardly extending envelope of products of combustion leading from the upper portion of the chamber to the flue gas outlet, substantially as described.

7. In a furnace, the combination of a vertical axis combustion chamber having its upper end closed, and having an oil vaporizing burner sealed to its lower end, a flue gas outlet from the combustion chamber substantially at the level of the burner, a combustion air chamber surrounding the burner, there being a series of combustion air openings between said combustion air chamber and the burner, a plenum fan beneath the burner, means to establish an air heating passage upwardly from said fan around the burner combustion air chamber and the combustion chamber aforesaid, there being an opening from the heating passage into the combustion air chamber and a damper therefor, and there being another opening in the floor of the combustion air chamber and above the fan, together with a barometric damper for said last named openings constructed to close or open in response to the operation or inoperation, respectively, of said fan substantially as described.

8. In a furnace, the combination of a vertical axis combustion chamber having its upper end closed, and having an oil vaporizing burner sealed to its lower end, a flue gas outlet from the combustion chamber substantially at the level of the burner, a combustion air chamber surrounding the burner, there being a series of combustion air openings between said combustion air chamber and the burner, a plenum air passage in proximity to the combustion air chamber, there being an air opening from said plenum air passage to the combustion air chamber together with a fixed adjustment damper for said opening, and there being another air opening into the combustion air chamber, together with a damper for said last named air opening, constructed to close or open in response to the operation or inoperation, respectively, of said fan, substantially as described.

9. In a furnace, the combination of a vertical axis combustion chamber having its upper end closed, and having an oil vaporizing burner sealed to its lower end, a flue gas outlet from the combustion chamber substantially at the level of the burner, a combustion air chamber surrounding the burner, there being a series of air openings from said combustion air chamber to the burner, there being an air supply opening into the combustion air chamber and another pilot air supply opening into said chamber, a fixed adjustment damper for the first mentioned air supply opening, and another damper for the pilot air supply opening said damper constructed to close under supply of pressure air, together with means to supply pressure air to said damper locations whereby during one set of conditions for operation with pressure air there is created a radiant heat flame of combustion in the combustion chamber extending upwardly therein and surrounded by a downwardly extending envelope of products of combustion leading to the flue gas outlet aforesaid with attendant low temperature of flue gases, and whereby during another set of conditions and in the absence of pressure air supply there is created a relatively small flame operation within the combustion chamber with delivery of products of combustion substantially directly to the flue gas outlet and with attendant higher flue gas temperatures, substantially as described.

10. In a furnace, the combination of a vertical axis cylindrical combustion chamber having its upper end closed, a vaporizing oil burner located in the lower portion of said chamber, and having a flame opening leading upwardly into the lower portion of the combustion chamber, partition means to establish a delivery chamber for combusted gases in the lower portion of the combustion chamber and surrounding the burner, combustion air supply passages between the burner and said delivery chamber for preheating air therein, and a flue connection from the delivery chamber, said flue connection having a portion thereof extending above the partition means in direct communication with the portion of the combustion chamber above said partition means, and damper means in said last named portion, substantially as described.

11. In a furnace, the combination of a vertical axis cylindrical combustion chamber having its upper end closed, a vaporizing oil burner located in the lower portion of said chamber, and having a flame opening leading upwardly into the lower portion of the combustion chamber, partition means to establish a delivery chamber for combusted gases in the lower portion of the combustion chamber and surrounding the burner, combustion air supply passages between the burner and said delivery chamber for preheating air therein, a flue connection from the delivery chamber substantially at the level of the above said partition means, and having communication directly with the delivery chamber and also with the portion of the combustion chamber above said partition means, and means to restrict the last named communication, said restricting means being movable to permit introduction of suitable instrumentalities through the flue connection directly to the burner and burner opening, substantially as described.

12. In a furnace, the combination of a vertical axis cylindrical combustion chamber of relatively small size for the intended heating capacity, a vaporizing oil burner located in the lower central portion of said chamber and having a central upwardly reaching flame opening, a flue connection from the combustion chamber adjacent to the level of said flame opening, means to supply plenum air to the burner for combustion, said plenum means creating air pressure greater than needed for circulating air operations, and having lateral air delivery, and wall means directly in the path of travel of circulating air from said plenum means and serving to deliver circulating air upwardly along the outer surface of the combustion chamber, whereby there is created an upwardly extending luminous flame in the central portion of the combustion chamber surrounded by a downwardly extending envelope of products of combustion flowing to the flue connection to thereby ensure delivery of radiant heat from said flame directly to the wall of the combustion chamber through said envelope together with creation of a high velocity of downward movement of said gaseous envelope adjacent to the combustion chamber wall with consequent high heat transfer co-efficient, and whereby there is also created a high degree of turbulence of circulating air flowing upwardly around the combustion chamber with consequent high heat transfer co-efficient, substantially as described.

13. In a furnace, the combination of a vertical axis cylindrical combustion chamber of relatively small size for the intended heating capacity, a vaporizing oil burner located in the lower central portion of said chamber and having a central upwardly facing flame delivery opening, a flue connection from the combustion chamber adjacent to the level of said flame opening, means to establish an annular circulating air passage around the combustion chamber and against the wall of the same, said annular passage being of relatively small size for the intended circulating air capacity a fan space beneath said parts and in connection with the lower portion of said air circulating passage; a plenum air fan in said fan space and having a relatively high air pressure delivery with a large radial component of air movement at delivery, said fan delivery circulating air directly against the lower portion of the circulating air passage establishing means to thereby cause substantially right angular change of circulating air direction of movement with consequent creation of a high degree of turbulence in said air a combustion air connection from said fan space to the burner, whereby there is produced within the combustion chamber a central upwardly reaching luminous flame surrounded by a downwardly flowing envelope of hot products of combustion flowing to the flue connection, with consequent delivery of a large proportion of radiant heat directly from the said flame to the wall of the combustion chamber through the said envelope, and whereby said envelope travels along the wall of the combustion chamber with high velocity and consequent high heat transfer co-efficient, and whereby there is also created a high heat transfer co-efficient of heat transfer from the wall of the combustion chamber to the circulating air, substantially as described.

14. In a furnace, the combination of a vertical axis cylindrical combustion chamber, a vaporizing oil burner located in the lower portion thereof and having a central flame opening for delivery of the flame upwardly in the combustion chamber, a flue connection from the lower portion of the combustion chamber and adjacent to said burner opening level, a relatively thin annular circulating air passage around and in direct contact with the wall of the combustion chamber a fan space beneath said parts and in connection with the lower portion of said air circulating passage; plenum air fan in said fan space and having a lateral circulating air delivery with relatively high radial component of air movement against the wall of the annular circulating air passage to thereby create a high degree of turbulence in said air a combustion air connection from said fan space to the burner, whereby there is produced a delivery of a relatively large amount of radiant heat directly from the luminous flame to the wall of the combustion chamber and through the downwardly flowing gases of combustion flowing to the flue opening, and also a high heat transfer co-efficient from said gases to the combustion chamber wall, and whereby there is also created a high heat transfer co-efficient from said combustion chamber wall to the stream of circulating air flowing upwardly thereagainst, substantially as described.

RAYMOND E. YOUNG.